United States Patent
Kotani et al.

[11] Patent Number: 5,449,734
[45] Date of Patent: Sep. 12, 1995

[54] CURABLE COMPOSITION

[75] Inventors: Jun Kotani; Kiyoshi Andoh; Takahisa Iwahara; Kazuya Yonezawa, all of Hyogo, Japan

[73] Assignee: Kanegafuchi Kagaku Kogyo Kabushiki Kaisha, Osaka, Japan

[21] Appl. No.: 208,106

[22] Filed: Mar. 8, 1994

[30] Foreign Application Priority Data

Mar. 10, 1993 [JP] Japan ................... 5-075104

[51] Int. Cl.⁶ ............................................. C08G 77/08
[52] U.S. Cl. ............................. 528/12; 528/15; 528/23
[58] Field of Search ................... 528/15, 12, 23

[56] References Cited

U.S. PATENT DOCUMENTS

| | | | |
|---|---|---|---|
| 3,419,593 | 12/1968 | Willing | 528/31 |
| 3,936,581 | 2/1976 | Garden | |
| 4,558,109 | 12/1985 | McAfee | |
| 5,283,307 | 2/1994 | Larson | 528/15 |

FOREIGN PATENT DOCUMENTS 0169529  1/1986  European Pat. Off.
2228088  11/1974  France.

Primary Examiner—Melvyn I. Marquis
Attorney, Agent, or Firm—Armstrong, Westerman, Hattori, McLeland & Naughton

[57] ABSTRACT

A curable composition containing (A) a compound having at least two Si—H bonds, (B) a silicon compound having at least two substituents bonded to the silicon atom thereof, wherein the substituents each have an olefin bond, (C) a neutral platinum catalyst, (D) a silicon compound having at least two alkoxy groups bonded to the silicon atom thereof, and (E) a catalyst for silanol condensation.

4 Claims, No Drawings

CURABLE COMPOSITION

DETAILED DESCRIPTION OF THE INVENTION

Field of the Invention

This invention relates to a novel curable composition and more particularly to a curable composition providing a cured product having a novel silicon type interpenetrating polymer network (hereinafter referred to as IPN).

In particularly, it relates to a curable composition comprising properly selected components so as to provide a cured product having a silicon type IPN composed of a silicic acid skeleton and a silicon-containing polymer, e.g., polycarbosilane or polysiloxane.

Addition reaction of a compound having an Si—H bond to an olefin bond (or an acetylene bond) is known as a hydrosilylation reaction. Hydrosilylation of an olefin bond may be explained with referring to the following reaction scheme:

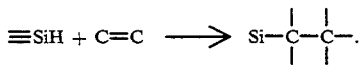

The above-mentioned mode of reaction occurs even in the absence of a catalyst or under irradiation of γ-rays or ultraviolet rays or in the presence of a radical generator or in the presence of a transition metal catalyst, such as a platinum compound (e.g., chloroplatinic acid) or a rhodium compound. Hydrosilylation can be utilized as a curing system of a curable composition. For example, reaction between a compound having a plurality of Si—H bonds and a compound having a plurality of olefin bond-containing substituents gives a cured product.

It is well known in the art that a siloxane bond is formed by hydrolysis and condensation of a silicon compound having an alkoxy group as shown by the following reaction scheme:

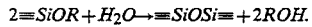

For example, hydrolysis and condensation of a polyfunctional alkoxy-containing silicon compound or a halogen-containing silicon compound produce organopolysiloxane, organopolysilsesquioxane or silica, which is useful as grease, oil, heat-resistant varnish, insulating varnish, an insulating protective film for semiconductor bases or silica gel.

It is possible to simultaneously build up a silicon-containing polymer having excellent toughness, moldability and thermal stability and a silicic acid network skeleton having excellent rigidity, environmental resistance and non-combustible properties in the same system by the reaction among a polyfunctional Si—H bond-containing compound, a double bond-containing silicon compound, and an alkoxy-containing silicon compound. The reaction product is a highly rigid, light constructional material excellent in heat resistance in which the silicon-containing polymer and the silicic acid network skeleton seem to form interpenetrating polymer network.

However, when hydrosilylation and hydrolysis-condensation of an alkoxysilyl group are conducted simultaneously, the reaction system will contain water to be used for the condensation and by-products, i.e., an alcohol and a silanol. Since an Si—H bond is susceptible to solvolysis, it is easily converted to an alkoxysilane in the presence of an alcohol or water to generate $H_2$. For this reason, the formation of a silicon type IPN is accompanied by a reduction in yield of the hydrosilylation.

SUMMARY OF THE INVENTION

It has now been found that hydrosilylation and hydrolysis-condensation of an alkoxysilane can be performed simultaneously in the same reactor in good yield without being accompanied by formation of unfavorable by-products by properly selecting the reactants and a catalyst. The present invention has been completed based on this finding.

That present invention relates to a curable composition containing (A) a compound having at least two Si—H bonds, (B) a silicon compound having at least two substituents bonded to the silicon atom thereof, wherein the substituents each have an olefin bond, (C) a neutral platinum catalyst, (D) a silicon compound having at least two alkoxy groups bonded to the silicon atom thereof, and (E) a catalyst for silanol condensation.

The compound having at least two Si—H bonds in the molecule thereof as component (A) includes those represented by formula:

$$H_aR_bSi(OR)_{4-(a+b)}$$

wherein R represents a monovalent organic group selected from an alkyl group having 1 to 20, preferably 1 to 6 carbon atoms (e.g., methyl, ethyl, propyl, butyl or octyl group), a cycloalkyl group having 3 to 20, preferably 3 to 6 carbon atoms (e.g., cyclohexyl group), an aryl group having 6 to 20 carbon atoms (e.g., phenyl or naphthyl group), an aralkyl group having 6 to 20 carbon atoms (e.g., benzyl or phenylethyl group), a haloalkyl group having 1 to 20, preferably 1 to 6 carbon atoms (e.g., chloromethyl group), a haloaryl group having 6 to 20 carbon atoms (e.g., chlorophenyl group), and a silyl group having 0 to 20, preferably 0 to 6 carbon atoms (e.g., trimethylsilyl group); a plurality of R may be the same or different; a represents 2 or 3; b represents a number of from 0 to 2; and (a+b) represents a number of from 2 to 4.

Examples of the compounds of the above formula are diethoxysilane, dimethoxysilane, diethylsilane, diethylsilane, diphenylsilane, phenylmethylsilane, and ethoxysilane.

Additionally, component (A) includes compounds represented by formula:

wherein R is as defined above; X represents a divalent organic group (e.g., an alkylene group, a phenylene group, a phenyl ether group or a siloxane group), an amino group or an oxygen atom.

Examples of the compounds of the above formula are shown below.

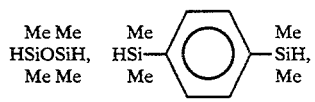

-continued

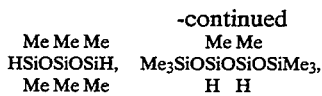

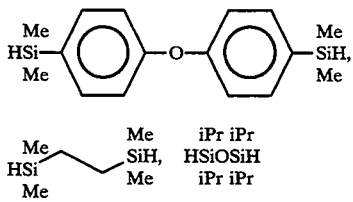

wherein Me represents a methyl group; and iPr represents an isopropyl group.

Further included in component (A) are polymers, copolymers or cyclic compounds comprising a unit represented by formula $R_3SiO_{0.5}$, $R_2SiO$ or $RSiO_{1.5}$ (wherein R is as defined above) and at least one unit represented by formula $RHSiO$, $R_2HSiO_{0.5}$, $HSiO_{1.5}$, $H_2SiO$ or $RH_2SiO_{0.5}$ (wherein R is as defined above) in the molecule thereof. Specific examples of these compounds are shown below.

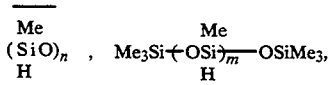

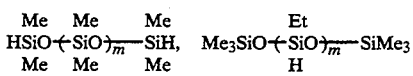

wherein Me is as defined above; Et represents an ethyl group; n represents a number of from 3 to 5; and m represents a number of from 2 to 10,000.

Among the above-illustrated Si—H bond-containing compounds, those having a phenyl group, a siloxy group or a like substituent bonded to the silicon atom thereof are preferred from the viewpoint of stability to alcohols, selectivity and reactivity in hydrosilylation.

The silicon compound having at least two olefin bond-containing substituents bonded to the silicon atom thereof as component (B) includes those represented by formula:

$$R'_cSiR_{4-c}$$

wherein R is as defined above; R' represents an organic group having at least one olefin bond (e.g., a vinyl group, an allyl group or a butenyl group) (the olefin bond may be positioned at the terminal or end intramolecular) or a cyclic organic group having at least one olefin bond in the ring thereof (e.g., a cyclohexenyl group or a cycloheptenyl group); a plurality of R or R' may be the same or different; and c represents a number of from 2 to 4.

Specific examples of the compounds of the above formula include dimethyldivinylsilane, diethoxydivinylsilane, phenylmethyldivinylsilane, diphenyldivinylsilane, dimethyldiallylsilane, phenylmethyldiallylsilane, and tetravinylsilane.

Component (B) further includes compounds represented by formula:

$$R'SiR_2-X-SiR_2R'$$

wherein R, R', and X are as defined above.

Specific examples of these compounds are shown below.

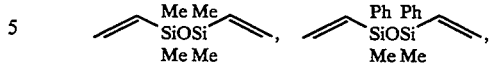

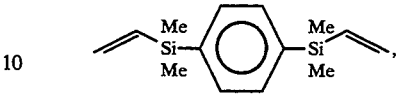

wherein Me is as defined above; and Ph represents a phenyl group.

Component (C) furthermore includes polymers, copolymers or cyclic compounds comprising a unit represented by formula $R_3SiO_{0.5}$, $R_2SiO$ or $RSiO_{1.5}$ (wherein R is as defined above) and at least one unit represented by formula $RR'SiO$, $R_2R'SiO_{0.5}$, $R'SiO_{1.5}$, $R'_2SiO$ or $RR'_2SiO_{0.5}$ (wherein R and R' are as defined above) in the molecule thereof. Specific examples of these compounds are shown below.

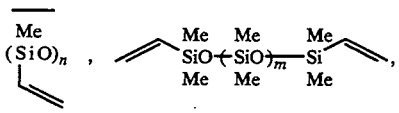

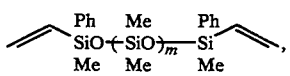

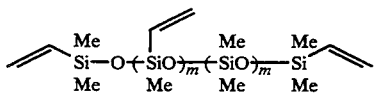

wherein Me, Ph, n, and m are as defined above.

Hydrosilylation between components (A) and (B) can be carried out by mixing them with a neutral platinum catalyst as component (C) and maintaining the reaction temperature at 0° to 150° C., preferably 10° to 80° C.

A ratio of component (A) to component (B) is subject to wide variation and is preferably from 1:10 to 1:0.1, and more preferably an equivalent ratio.

The neutral platinum catalyst as component (C) includes platinum-organic compound complexes, platinum-organic functional siloxane complexes, and platinum-diolefin compound complexes.

Preferred component (C) include a platinum-vinylsiloxane complex, a platinum-acac complex (acac: acetylacetonato), and a platinum-decadiene complex.

The amount of component (C) to be used is subject to wide variation. In order to maintain a sufficiently high reaction rate at a controlled reaction temperature, component (C) is desirably used in an amount of from $1 \times 10^{-1}$ to $1 \times 10^{-6}$ mol, and preferably from $1 \times 10^{-3}$ to $1 \times 10^{-5}$ mol, per mol of the Si—H bond-containing compound.

The silicon compound having at least two alkoxy groups bonded to the silicon atom thereof as component (D) includes those represented by formula:

$(RO)_d SiR_{4-d}$ wherein R is as defined above; a plurality of R may be the same or different; and d represents a number of from 2 to 4.

Specific examples of these compounds are dimethyldiethoxysilane, diphenyldiethoxysilane, methyltrimethoxysilane, tetraethoxysilane, and tetramethoxysilane.

Additionally, various organopolysiloxane compounds can also be used as an alkoxy-containing compound. They are linear polymers, copolymers or cyclic compounds comprising a unit represented by formula $R_3SiO_{0.5}$, $R_2SiO$ or $RSiO_{1.5}$ (wherein R is as defined above) and at least one unit represented by formula $R(RO)SiO$, $R_2(RO)SiO_{0.5}$, $(RO)SiO_{1.5}$, $(RO)_2SiO$ or $R(RO)_2SiO_{0.5}$ (wherein R is as defined above) in the molecule thereof. Specific examples of these compounds are shown below.

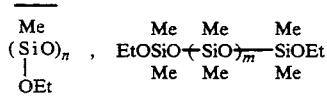

wherein Me, Et, n, and m are as defined above.

Preferred of them are those having a methoxy group, an ethoxy group or a phenoxy group on the silicon atom thereof from the standpoint of reactivity and selectivity in the hydrolysis-condensation reaction. Those having a methoxy group are most preferred.

The silanol condensation catalyst as component (E) includes various acids and bases, such as inorganic acids (e.g., hydrochloric acid and phosphoric acid), organic acids (e.g., acetic acid and p-toluenesulfonic acid), organophosphoric acid (e.g., di(n-butyl) phosphate and di(2-ethylhexyl) phosphite), and bases (e.g., ammonia). It is recommended to use hydrochloric acid in the absence of a solvent or to use an organophosphoric acid in the presence of a solvent for the reason that they do not poison the catalyst for hydrosilylation.

The amount of component (E) to be used is subject to wide variation. In order to maintain a sufficiently high reaction rate at a controlled reaction temperature, component (E) is desirably used in an amount of from $1 \times 10^{-1}$ to $1 \times 10^{-8}$ mol, and preferably from $1 \times 10^{-2}$ to $1 \times 10^{-4}$ mol, per mol of the alkoxy-containing compound (D).

In simultaneously carrying out hydrosilylation using components (A), (B) and (C) and hydrolysis-condensation using components (D) and (E), the ratio of component (A) or (B), which is used in the hydrosilylation and component, to component (D), which is used in the hydrolysis-condensation reaction, is subject to wide variation.

The concurrent reactions of hydrolysis and condensation reactions can be effected over a broad range of temperature. Reaction temperatures of not more than 300° C. are generally advantageous. In order to assure reaction stability and a sufficient reaction rate in low catalyst concentrations, the reactions are usually performed at a temperature of from 10° to 150° C., and preferably from 10° to 80° C. The reaction time largely depends on the properties of the reactants used and the reaction temperature. The reactions mostly complete in about 1 day at a reaction temperature of 50° C. or higher. More time tends to be needed at lower temperatures.

The reactions can be conducted under atmospheric pressure or under pressure. Where the reactants have a high boiling point, atmospheric pressure is preferred. If any reactant is in gaseous state at ambient temperature, the reactions are preferably carried out below atmospheric pressure. The reaction system may be in the presence of oxygen or free from oxygen.

A reaction solvent may be employed if desired. A reaction solvent is selected from those inert to the reactants, such as organic solvents including hydrocarbons (e.g., benzene, toluene, xylene, n-hexane and h-heptane), ethers (e.g., diethyl ether and tetrahydrofuran), halogenated hydrocarbons (e.g., chloroform and methylene chloride), alcohols (e.g., methanol, ethanol, and 1-propanol), and ketones (e.g., acetone and methyl ethyl ketone).

In the composition, reactions among a polyfunctional Si—H bond-containing compound, a double bond-containing silicon compound, and an alkoxy-containing silicon compound simultaneously take place to build up a silicon-containing polymer having excellent toughness, moldability and thermal stability and a silicic acid network skeleton having excellent rigidity, environmental resistance and non-combustible properties in the same system to provide a highly rigid, light constructional material having excellent heat resistance in which the silicon-containing polymer and the silicic acid network skeleton forms interpenetrating polymer network.

The present invention is hereinafter described in greater detail with reference to examples, which are not to be construed as limiting the scope thereof. Unless otherwise indicated, all parts, percents and ratios are by weight.

REFERENCE EXAMPLE 1

Five millimoles of 1,1,1,3,5,5,5-heptamethyltrisiloxane, 5 mmol of dimethylphenylvinylsilane, and 5 mmol of dimethylethoxyphenylsilane were mixed. To the mixture were added 5 mmol of water, $5 \times 10^{-4}$ mmol of a platinum-vinylsiloxane complex, and 0.1 mmol of hydrochloric acid, followed by stirring at room temperature for 3 hours. Quantitative determination of the reaction product by gas chromatography revealed that 2,2-di-trimethylsiloxy-5-phenyl-5-methyl-2,5-disilahexane was obtained in a yield of 99% as a hydrosilylation addition product and 1,3-diphenyl-1,1,3,3-tetramethyldisiloxane was obtained in a yield of 99% as an alkoxysilane condensation product.

REFERENCE EXAMPLES 2 TO 8

Reactions were carried out in the same manner as in Reference Example 1, except for altering the kind and amount of reactants and the reaction conditions as shown in Table 1 below, and the yields of the addition product and the condensation product were obtained. The results are shown in Table 1. Abbreviations in Table 1 have the following meanings.

HMTS: 1,1,1,3,5,5,5-heptamethyltrisiloxane
DMPS: dimethylphenylsilane
DEPS: dimethylethoxyphenylsilane
MTMS: methyltrimethoxysilane
TMPS: trimethylphenoxysilane
Pt-V: platinum-vinylsiloxane complex
Pt-a: platinum-acac complex
DBPP: di(n-butyl) phosphite
DEPP: di(2-ethylhexyl) phosphite

TABLE 1

| Reference Example No. | Hydro-silane | Alkoxy-silane | Platinum Catalyst | Condensation Catalyst | Reaction Conditions ||| Reaction Yield ||
|---|---|---|---|---|---|---|---|---|---|
| | | | | | Temp. (°C.) | Solvent | Time | Hydrosilylation (%) | Condensation (%) |
| 2 | DMPS | DEPS | Pt-V | DBPP | r.t. | — | 7 days | 96 | 100 |
| 3 | DMPS | DEPS | Pt-V | DBPP | r.t. | i-PrOH | 7 days | 92 | 100 |
| 4 | HMTS | DEPS | Pt-V | DBPP | 50 | — | 24 hrs | 77 | 97 |
| 5 | DMPS | DEPS | Pt-V | DBPP | 50 | — | 96 hrs | 90 | 97 |
| 6 | HMTS | MTMS | Pt-a | HCl | r.t. | — | 4 hrs | 88 | 100 |
| 7 | HMTS | TMPS | Pt-a | HCl | r.t. | — | 4 hrs | 90 | 100 |
| 8 | HMTS | DEPS | Pt-V | DEPP | r.t. | — | 8 days | 79 | 95 |

REFERENCE EXAMPLE 9

Reactions were carried out in the same manner as in Reference Example 1, except for using chloroplatinic acid hexahydrate as a platinum catalyst. As a result, the addition product by hydrosilylation and the condensation product were obtained in yields of 6% and 100%, respectively.

TABLE 2

| Reference Example NO. | Hydro-silane | Alkoxy-silane | Pt Catalyst | Condensation Catalyst* |
|---|---|---|---|---|
| 9 | DMPS | MTMS | $H_2PtCl_6 \cdot 6H_2O$ | HCl |

| Reaction Conditions ||| Reaction Yield ||
|---|---|---|---|---|
| *Temp. | Solvent | Time | Hydrosilylation (%) | Condensation (%) |
| r.t. | — | 24 hrs | 6 | 100 |

It can be seen from the foregoing Reference Examples that a neutral platinum catalyst is suitable as a catalyst for hydrosilylation so that the curing reaction by hydrosilylation and the curing reaction by hydrolysis-condensation may be proceed simultaneously.

EXAMPLE 1,1,1,3,5,5-hexamethyltrisiloxane (0.75 mmol), 0.75 mmol of divinylmethylphenylsilane, 0.125 mmol of 1,3,5,7-tetramethylcyclotetrasiloxane, and 320 mg of ethyl silicate 40 (a product of Colcoat company) were mixed. To the mixture were added 5 mmol of water, $2 \times 10^{-4}$ mmol of a platinum-vinylsiloxane complex, 0.1 mmol of di(2-ethylhexyl) phosphate, and 0.5 m$l$ of isopropyl alcohol were added thereto, followed by stirring well to prepare a clear uniform solution. The resultant solution was coated on a glass plate and heated at 50° C. for 2 hours and then at 80° C. for 3 hours to form a transparent uniform cured film.

While the invention has been described in detail and with reference to specific embodiments thereof, it will be apparent to one skilled in the art that various changes and modifications can be made therein without departing from the spirits and scope thereof.

What is claimed is:

1. A curable composition containing (A) a compound having at least two Si—H bonds, (B) a silicon compound having at least two substituents bonded to the silicon atom thereof, wherein the substituents each have an olefin bond, (C) a neutral platinum catalyst, (D) a silicon compound of the formula $(RO)_d SiR_{4-d}$, wherein each R is an alkyl group having 1 to 20 carbon atoms, a cycloalkyl group having 3 to 20 carbon atoms, an aryl group having 6 to 20 carbon atoms or a haloaryl group having 6 to 20 carbon atoms, and d is a number from 2 to 4, and (E) is a catalyst for silanol condensation.

2. The curable composition as claimed in claim 1, wherein the compound (A) has the formula $H_a R_b Si(OR)_{4-(a+b)}$, wherein R is defined as in claim 2, a is 2 or 3, b is a number from 0 to 2, and (a+b) is a number from 2 to 4.

3. The curable composition as claimed in claim 1, wherein the silicon compound (B) has the formula $R^1_c SiR_{4-c}$, wherein $R^1$ is an organic group having at least one olefinic double bond, R is as defined in claim 2 and c is a number from 2 to 4.

4. The curable composition as claimed in claim 1, wherein the catalyst (E) for silanol condensation is an inorganic acid, an organic acid or a base.

* * * * *